United States Patent [19]

Cosman et al.

[11] Patent Number: 5,011,396
[45] Date of Patent: Apr. 30, 1991

[54] QUICK COUPLING DEVICE FOR EXCHANGING PLASTICIZING UNIT OF AN INJECTION MOLDING MACHINE

[75] Inventors: John Cosman, Bolton; Victor Silaghi, Willowdale, both of Canada

[73] Assignee: Husky Injection Molding Systems, Ltd., Bolten, Canada

[21] Appl. No.: 502,748

[22] Filed: Apr. 2, 1990

[51] Int. Cl.⁵ .................. B29C 45/46; B29C 45/70
[52] U.S. Cl. ............................ 425/190; 366/266; 366/318; 425/542; 425/376.1
[58] Field of Search ............... 425/182, 190, 376.1, 425/542, 185; 366/266, 318

[56] References Cited

U.S. PATENT DOCUMENTS

| | | | |
|---|---|---|---|
| 3,408,694 | 11/1968 | Matsuoka | 425/192 |
| 4,242,944 | 1/1981 | Su | 425/542 |
| 4,704,078 | 11/1987 | Hehl | 425/185 |
| 4,708,622 | 11/1987 | Hehl | 425/185 |
| 4,808,103 | 2/1989 | Hehl | 425/190 |

Primary Examiner—Willard Hoag
Attorney, Agent, or Firm—Bachman & LaPointe

[57] ABSTRACT

An injection molding machine comprising a drive unit and a plasticizing unit and includes a quick disconnect coupling mechanism for connecting the feed screw of the plasticizing unit to and disconnecting it from the quill of the driving unit.

9 Claims, 2 Drawing Sheets

QUICK COUPLING DEVICE FOR EXCHANGING PLASTICIZING UNIT OF AN INJECTION MOLDING MACHINE

BACKGROUND OF THE INVENTION

The present invention relates to an injection molding machine and, more particularly, an injection molding machine provided with an improved quick disconnect coupling mechanism between the plasticizing unit and drive unit which allows for quick change of the plasticizing unit.

In injection molding, it is frequently necessary to modify the thermoplastic material composition depending on the type of part being produced. In conventional machines, a change in material composition requires prolonged purging of material through the plasticizing unit when changing from one resin material to another thereby resulting in a waste of resin, energy and time.

In order to avoid the disadvantages associated with prolonged purging, it is known in the prior art to simply remove the plasticizing unit, that is the barrel and screw assembly, and to substitute therefor a clean, preheated set of components for the new resin.

U.S. Pat. 4,704,078 and U.S. Pat. No. 4,708,622 to Hehl show how a quick barrel change system can be facilitated in small injection molding machines. In the '078 and '622 patents, an injection molding machine is disclosed which has an exchangeable plasticizing unit comprising a barrel and a feed screw, a drive unit includes a spindle for imparting rotation to an actual shifting of the feed screw within the barrel. A coupling assembly is provided for operatively connecting and disconnecting the spindle of the drive unit to the feed screw of the plasticizing unit. As can be seen in FIG. 8 of the '078 patent, the coupling assembly for coupling the drive motor to the feed screw for supplying torque to the drive screw is transmitted through a drive dog 26. The main disadvantage of the drive dog design is that, for large machines where the power being transmitted from the drive motor to the screw is in the order of 50 hp or greater, the drive dog design is not sufficiently strong.

A further prior art device is disclosed in German Offenlegungsschrift No. DE 32 29 223. The '223 document discloses four different species of hydraulic couplings for connecting and disconnecting the plasticizing unit of the injection molding machine to the drive unit. The disadvantage of all of the species of hydraulic couplings is that they require a supply of pressurized hydraulic fluid to act on the screw connector in order to disengage the connector and allow for automatic screw removal. In order to supply the necessary pressurized hydraulic fluid, a complicated arrangement of seals and channels are required throughout the plasticizing unit and drive unit. The requirement for rotating seals complicates and reduces the reliability of the coupling system.

A further mechanism for quick changing of a plasticizing unit from a drive unit is disclosed in U.S. Pat. No. 4,588,365. The injection molding assembly disclosed in the '365 patent includes two separate extruder units which, by way of a switching device, can be selectively coupled and uncoupled to the drive unit of the injection molding machine. This arrangement requires a relatively complicated control system for interchanging the two extruder units.

Naturally, it would be highly desirable to provide a coupling mechanism for coupling the plasticizing unit of an injection molding machine to the drive unit thereof which is simple of construction and strong enough to allow for power transmission between the drive unit and the plasticizing unit in the order of 50 hp or more.

Accordingly, it is the principle object of the present invention to provide an injection molding machine provided with an improved coupling mechanism between the plasticizing unit and drive unit which allows for quick change of the plasticizing unit from the injection molding machine.

It is a further object of the present invention to provide a coupling mechanism as aforesaid which is sufficiently strong for use on large injection molding machines.

It is a still further object of the present invention to provide a coupling mechanism as aforesaid which is of simple construction, economic to manufacture and easily used with a high degree of reliability.

Further objects of the present invention will appear hereinbelow.

SUMMARY OF THE INVENTION

In accordance with the present invention, the foregoing objects and advantages are readily obtained.

The present invention relates to an injection molding machine and, more particularly, an injection molding machine provided with an improved coupling mechanism between the plasticizing unit and the drive unit which allows for quick change of the plasticizing unit. In accordance with the present invention, the injection molding machine comprises a plasticizing unit which is removably fastened to the injection molding machine. The plasticizing unit includes a barrel and a feed screw mounted in the barrel along an axis of injection. The feed screw has a screw portion and a shank portion. A drive unit is provided which includes a quill mounted along the axis of injection for rotating and axially moving the feed screw within the barrel. A coupling mechanism is provided for selectively securing the shank portion of the feed screw to the end face of the quill of the drive unit. In accordance with the present invention, the coupling mechanism includes a first recess portion provided with a female spline which is adapted to receive a male spline provided on the shank portion of the feed screw. A second threaded recess is provided about the female spline portion. A collar is mounted in the second recess portion and is held therein for rotatable movement between a first position and a second position. The collar is provided with an internal bore having a female spline which is identical to the female spline provided in the first recess of the quill. The female splines match with the male spline provided on the shank portion of the feed screw. As noted above, the collar is moved between a first position and wherein the female splines on the collar and first recesses are aligned so as to allow the shank portion of the feed screw to be inserted into and removed from the first recess. When the collar is positioned in its second position, the female splines are non-aligned thereby allowing for the shank portions to be held securely within the first recess.

In accordance with the preferred embodiment of the present invention, a locking member is provided for holding the collar within the second recess and includes a detent mechanism for holding the collar in either its first or second position.

The device of the present invention offers significant advantages over couplings heretofor known. First, by way of the spline connection between the feed screw and the quill of the drive unit, a strong coupling is made which can withstand the torque required by large injection molding machines without damaging the coupling connection. In addition, as the coupling mechanism is of simple construction, there is a high degree of reliability which is heretofor, not obtainable by prior art coupling devices.

Further objects and advantages of the present invention will appear hereinbelow.

DETAILED DESCRIPTION

Figure 1:
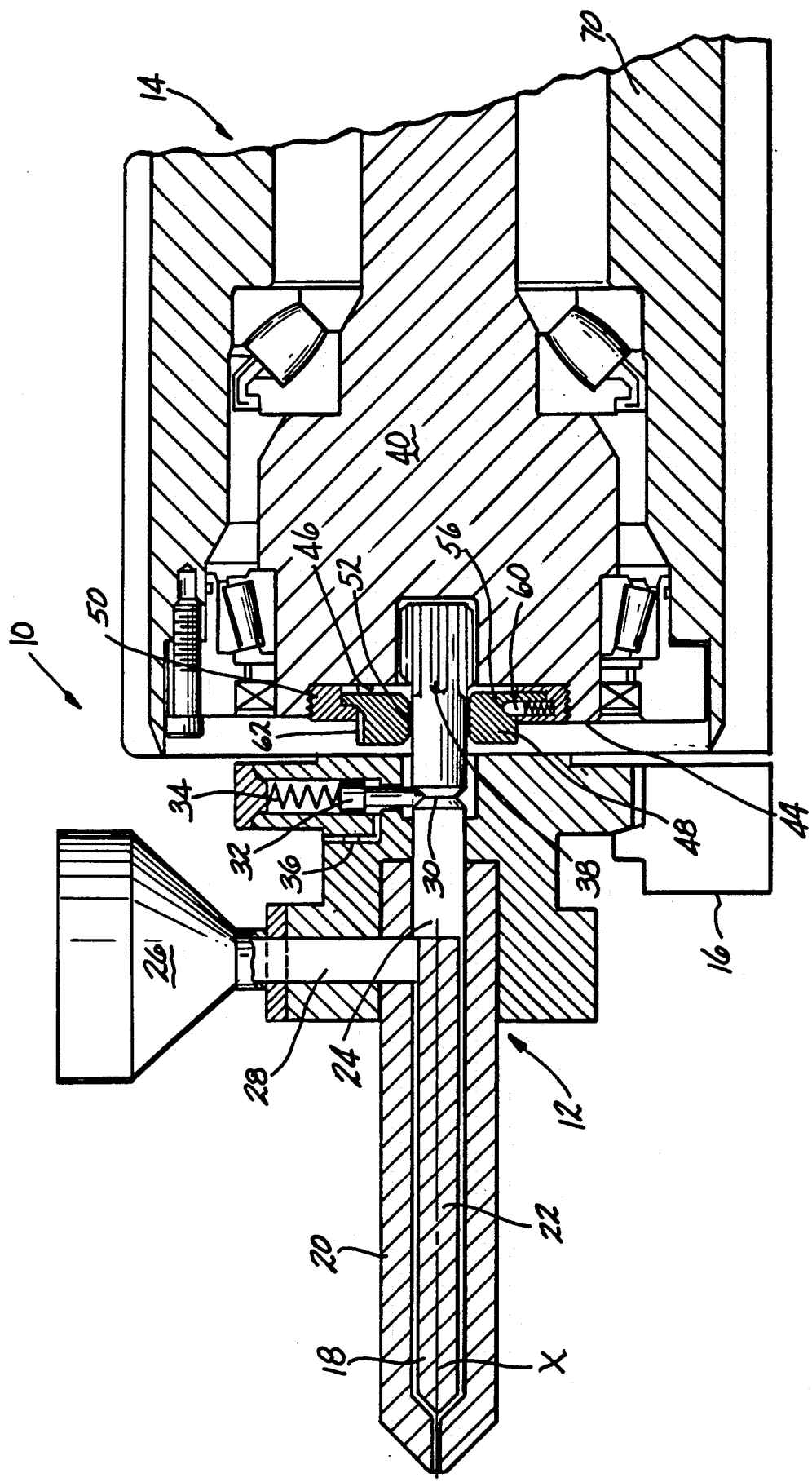
FIG. 1 is a schematic illustration in cross section of an injection molding machine employing the quick disconnection coupling mechanism of the present invention.

While the quick disconnect coupling mechanism of the present invention is described with reference to an injection molding machine and, particularly, the coupling of a plasticizing unit of the injection molding machine to the drive unit to the injection molding machine, it should be appreciated that the coupling mechanism may be employed in other embodiments without departing from the scope of the instant invention.

With reference to the drawings, an injection molding machine 10 comprises a plasticizing unit 12 and a drive unit 14. The plasticizing unit 12 is adapted to be removably fastened to the housing 16 of the injection molding machine 10 in known manner.

The plasticizing unit 12 of the injection molding machine includes a feed screw 18 which is rotatably and axially displaceable within a barrel 20 along an axis of injection X. The feed screw 18 comprises a screw portion 22 and a shank portion 24. A hopper 26 loaded with the material to be extruded is mounted on the injection molding machine and delivers the material to be extruded to the barrel 20 and the feed screw 18 via passage 28. The shank portion 24 of feed screw 18 is provided intermediately with a groove 30 which receives an arresting bolt 32 under the influence of spring 34 for reasons to be made clear hereinbelow. The underside of the arresting bolt 32 is connected with a pressure source via passage 36 in opposition to spring 34.

The drive unit 14 of the injection molding machine 10 includes a quill 40 rotatably mounted in a piston 70 for driving feed screw 18 in a rotatable and axial manner. The quill and piston are driven in a manner which is well-known in the art as, for example, disclosed in U.S. Pat. No. 4,731,005 and for the sake of simplicity is neither illustrated in the drawings nor will be described in detail herein.

The coupling mechanism of the present invention for securing the feed screw of plasticizing unit 12 to the quill 40 of drive unit 14 is described in detail with reference to FIGS. 1 and 2. The coupling mechanism comprises a first recess 42 provided in the end face 44 of quill 40 about the axis of injection X. Recess 42 is provided with a female spline which is adapted to receive the shank portion 24 of feed screw 18 which is provided with a male spline 38. The end face 44 of quill 40 is provided with a second recess 46 which receives a collar 48. The collar 48 is held in place within the recess 46 by means of a locking plate 50 which is threaded into threading recess 46 and secured therein. Locking collar 48 is mounted within recess 46 with the locking plate 50 so as to allow the collar 48 to rotate within the space defined by the recess 46 and locking plate 50. In order to allow for rotation of the collar, the collar 48 is mounted with an axial clearance within the space defined by recess 46 and locking plate 50 of approximately no greater than 0.005" in order to minimize the axial clearance of the spline 38 provided on feed screw 18 and the female spline 52 provided in an internal bore formed on the collar 48. In accordance with the present invention, female splines 42 and 52 are identical and match male spline 38 provided on feed screw 18.

Figure 2:
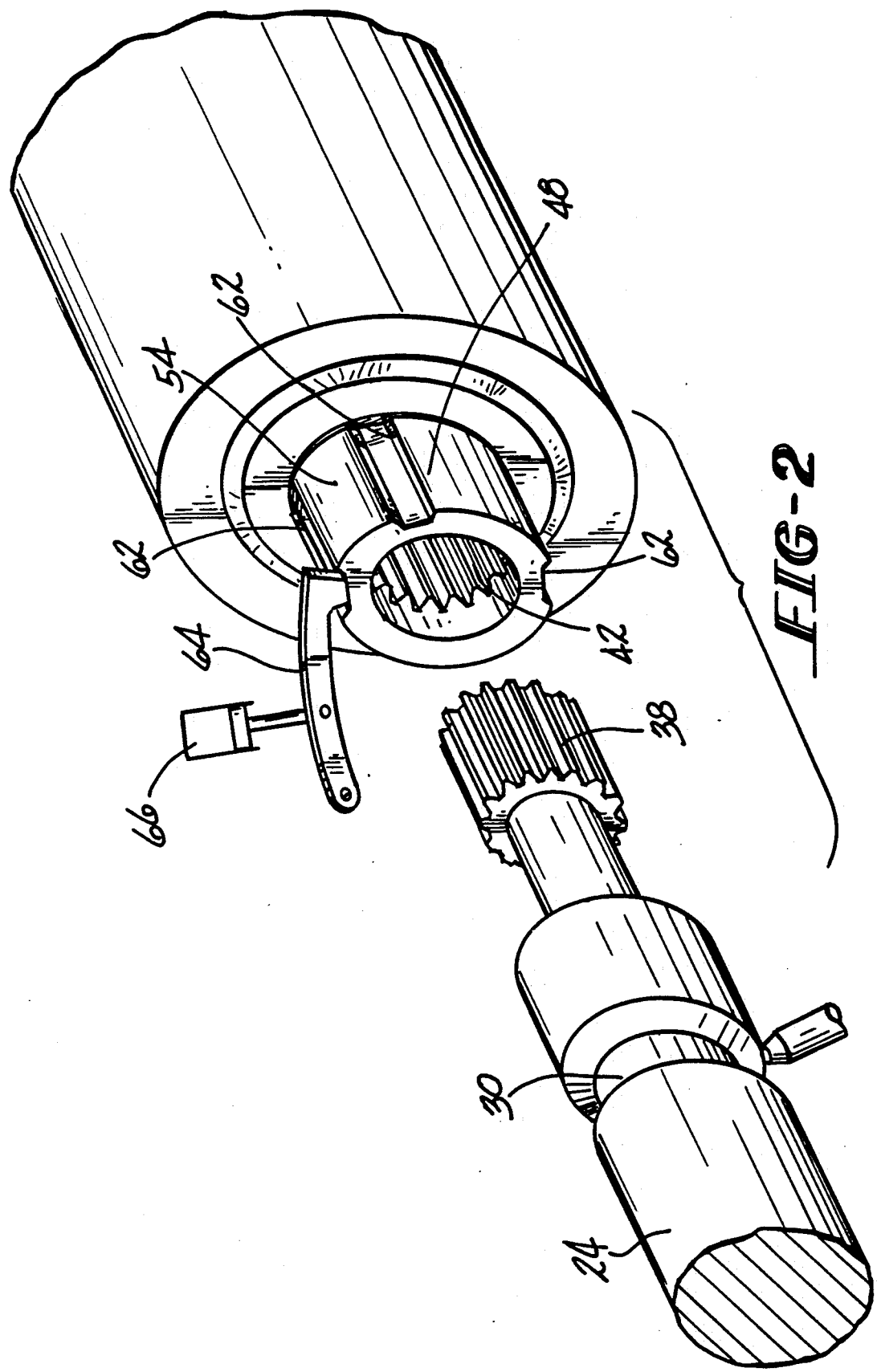
FIG. 2 is a partial exploded view illustrating the mechanism for coupling and uncoupling the feed screw from the driving unit of the injection molding machine of FIG. 1.

The external peripheral surface 54 of collar 48 is provided with first and second indents 56, only one of which is illustrated in FIG. 1, which receive detent 60 provided in locking plate 50 for holding the collar in a first position or in a second position as will be discussed hereinbelow. In addition, as is illustrated in FIG. 2, the collar is provided with several wrench slots 62 which are adapted to receive a holding arm 64 which is selectively pivotable into and out of a wrench slot 62 by means of a motor mechanism 66 which is schematically illustrated in FIG. 2.

The operation of the quick disconnect mechanism of the present invention is as follows. With reference to FIG. 1, spline portion 38 of shank portion 24 of feed screw 18 is illustrated as being locked in position within the recess portion 42 of quill 40. In this position, the spline connection between the quill 40 and the feed screw 18 allows for the quill 40 to drive the feed screw 18 both rotatably and axially. When the feed screw 18 is locked in place, the collar 48 assumes its first position wherein the spline 52 is non-aligned with the spline in recess 42. The collar is held in this first position by the detent 60 engaging indent 56. When it is desired to remove the plasticizing unit 12 from the drive unit 14, the motor mechanism 66 is actuated so as to engage arm 64 within a wrench slot 62. Quill 40 is then rotated relative to collar 48 as collar 48 is held stationary by arm 64. The rotation of quill 40 causes detent 60 to disengage from first indent 56 as locking plate 50 rotates with quill 40 relative to collar 48. The quill is rotated until detent 60 engages second indent 56 at which point the female spline provided in the quill 40 aligns with the female spline provided on collar 48. In order to again lock the feed screw 18 to the quill 40, the quill need only be rotated counter back to its original position wherein detent 60 again engages first indent 56. When the coupling is in its unlocked position, that is, when the female splines on quill 40 and collar 48 are in alignment, the feed screw can be disconnected from the quill 40 and thus the drive unit 14. In order to allow the plasticizing unit to be removed as a unit, hydraulic pressure is relieved from line 36 under detent pin 32. Thus allowing detent pin 32 to be biased by spring 34 into engagement with groove 30 provided on the shank portion 24 of feed screw 18. When in this position, the plasticizing unit may be removed as a whole from the drive unit of the injection molding machine.

As can be seen from the foregoing, the coupling mechanism of the present invention offers a simple construction which is economic to manufacture, exhibits a high degree of reliability and satisfies the object set out hereinabove. In addition, the system is readily adaptable to be semi or fully automatic as the flexibility of its design is easily adaptable to either construction.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In an injection molding machine, a removable plasticizing unit, said plasticizing unit including a barrel and a screw mounted in said barrel along an axis of injection, said screw having a shank portion; a drive unit including driving means mounted along said axis of injection for rotating an axially moving said screw within said barrel, said driving means having an end face; and coupling means for selectively securing said shank portion of said screw to said end face of said driving means, said coupling means including a first recess of depth X having a female spline located in said end face of said driving means about said axis of injection, a second recess of depth Y located in said end face about said first recess wherein X is greater than Y, a male spline located on the shank portion of said screw wherein said male spline and female spline are matching splines and collar means mounted in said second recess and rotatably movable between a first position and a second position, said collar means including an internal bore having a female spline substantially identical to said female spline in said end face of said driving means such that when said collar means is in said first position said female splines are aligned thereby allowing said male spline on said shank portion of said screw through said female spline on said collar means and into and out of said first recess so as to facilitate removal of said plasticizing unit from said molding machine and when said collar means is in said second position said female splines are non-aligned thereby locking said male screw spline in engagement with said female spline of said first recess.

2. Apparatus according to claim 1 wherein said second recess is threaded so as to receive a threaded locking plate for mounting said collar means within said second recess.

3. Apparatus according to claim 1 wherein said collar means includes locking means for holding said collar means against rotation upon rotation of said driving means for moving said collar means to said first and second positions.

4. Apparatus according to claim 3 wherein said locking means includes a slot provided in said collar means and motor actuated detent means for selectively engaging said slot.

5. Apparatus according to claim 2 wherein said collar means is mounted by said locking plate in said second recess so as to allow for an axial clearance of less than or equal to 0.005".

6. Apparatus according to claim 2 wherein said collar means is provided with a first indent and a second indent and said locking plate includes a detent means for engaging said first indent when said collar means is in said first position and said second indent when said collar means is in said second position.

7. Apparatus according to claim 3 wherein said second recess is threaded so as to receive a threaded locking plate for mounting said collar means within said second recess.

8. Apparatus according to claim 7 wherein said collar means is provided with a first indent and a second indent and said locking plate includes a detent means for engaging said first indent when said collar means is in said first position and said second indent when said collar means is in said second position.

9. Apparatus according to claim 1 wherein said shank portion of said screw is provided with a groove and said plasticizing unit includes detent means for selectively engaging said groove so as to allow removal of said plasticizing unit from said molding machine as a unit when said collar means is in said first position.

* * * * *